United States Patent Office 3,793,353
Patented Feb. 19, 1974

3,793,353
4-SUBSTITUTED-2-UNSATURATED ESTERS
Clive A. Henrick, Palo Alto, Calif., assignor to Zoecon Corporation, Palo Alto, Calif.
No Drawing. Continuation-in-part of abandoned application Ser. No. 201,195, Nov. 22, 1971. This application June 30, 1972, Ser. No. 267,861
Int. Cl. A01n 9/24; C07c 69/62, 69/66
U.S. Cl. 260—405                                    20 Claims

ABSTRACT OF THE DISCLOSURE

Syntheses of diene esters which comprises the reaction of a β-formyl-α,β-unsaturated ester with a Grignard followed by dehydration of the resulting hydroxy compound, intermediates therefor and the control of insects.

---

This is a continuation-in-part of Ser. No. 201,195, filed Nov. 22, 1971, and now abandoned.

This invention relates to the syntheses of di-unsaturated esters, which are useful for the control of insects. The present invention includes novel intermediates useful in the syntheses and for the control of insects.

Briefly stated, the syntheses of the present invention comprises the reaction of a 3-formyl-α,β-unsaturated ester with a Grignard to prepare a hydroxy compound, which is dehydrated to prepare the useful 2,4-di-unsaturated esters.

The syntheses of the present invention can be outlined as follows:

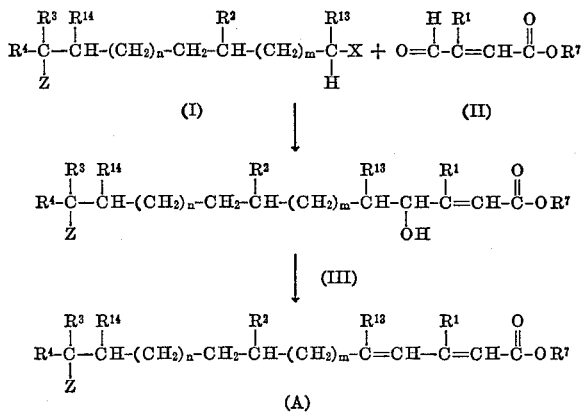

In the above formulas, each of $m$ and $n$ is zero or the positive integer one, two or three; each of $R^1$ and $R^2$ is lower alkyl; $R^4$ is alkyl; each of $R^3$, $R^{13}$ and $R^{14}$ is hydrogen or lower alkyl; $R^7$ is lower alkyl; X is bromo, chloro or iodo; and Z is hydrogen or lower alkoxy.

In the description hereinafter, each of $m$, $n$, $R^1$–$R^{14}$, X and Z is as defined above unless otherwise specified.

In the practice of the above-outlined syntheses, a Grignard is formed of the halide of Formula I by reaction with magnesium in an organic solvent, such as an ether solvent, and then reacted with a 3-formyl-α,β-unsaturated ester of Formula II to yield the 4-hydroxy ester of Formula III. This reaction is conducted in an organic solvent inert to the reaction, such as an ether solvent, in which the Grignard is prepared. The reactants are present in at least a mole to mole ratio or an excess of the Grignard is used. The reaction can be carried out at about room temperature or higher and is generally complete within a few minutes to a few hours.

In one embodiment of the present invention, the hydroxy compound of Formula III is directly dehydrated to the ester of Formula A by treatment with phosphorus oxychloride. This reaction is generally carried out in an organic solvent, such as pyridine, using one molar equivalent or an excess thereof of the phosphorus oxychloride.

In another embodiment of the present invention, a hydroxy compound of Formula III is dehydrated via the ester thereof of Formula IV.

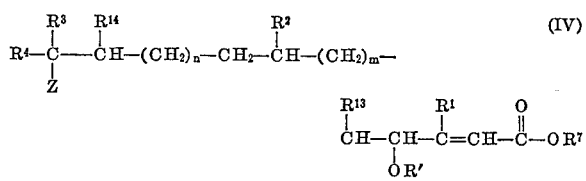

In this embodiment of the invention, the hydroxy compound of Formula III is treated with an esterification agent such as a carboxylic anhydride, e.g., acetic anhydride or the like, to form the corresponding 4-acylate, which is then subjected to pyrolysis to form the 2,4-diunsaturated ester of Formula A. The pyrolysis of allylic esters has been reported by Greenwood, J. Org. Chem. 27, 2308 (1962).

In another embodiment of the present invention, the dehydration of the hydroxy compound of Formula III can be carried out by first converting the hydroxy Compound III into the 4-chloro compound of Formula V and dehydrochlorinating the 4-chloro compound to the ester of Formula A.

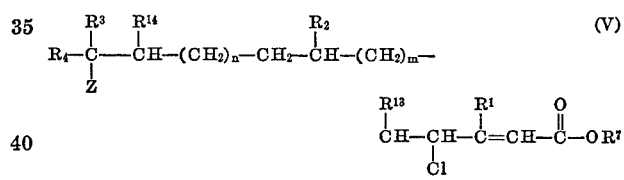

The 4-chloro compound of Formula V is prepared by the reaction of thionyl chloride in the presence of an amine, such as tributyl amine, in an organic solvent inert to the reaction. An alternative method is the treatment of the allylic alcohol of Formula III with collidine and lithium chloride in dimethylformamide. A 4-chloro compound of Formula V is dehydrochlorinated as, for example, by heating with collidine at an elevated temperature, such as from about 100° to 200°.

In another embodiment of the present invention, an allylic alcohol of Formula III is oxidized as by treatment with manganese dioxide or chromium trioxide in pyridine to produce 4-oxo compounds of Formula VI.

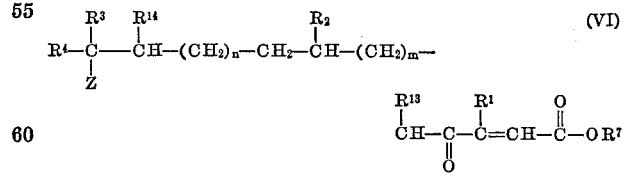

The 4-oxo compounds of Formula VI are useful for the control of insects.

The 3-formyl esters of Formula II can be prepared by procedures described by Pattenden and Weedon, J. Chem.

Soc. (C), 1984 (1968) and Pommer, Angew., Chem. 72 (22), (1960).

The halide precursors of Formula I can be prepared by the reduction of a carbonyl of Formula VII using sodium borohydride, or the like, to obtain the primary or secondary alcohol of Formula VIII, which is then halogenated to form the halide.

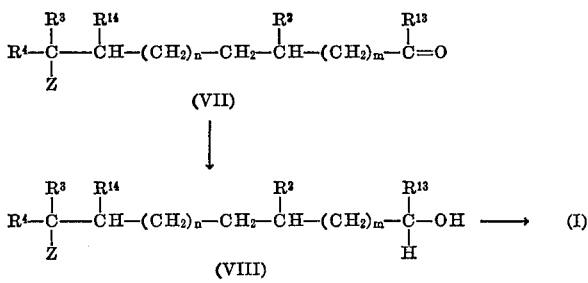

The halogenation of the alcohol of Formula VIII can be done using known procedures, such as treatment of the alcohol with phosphorus trichloride, phosphorus pentachloride, phosphorus tribromide, and the like. Alternatively, the alcohol can be first converted into the corresponding mesylate or tosylate and then treated with an alkali metal halide to form the halide of Formula I. The carbonyl compounds of Formula VII are described in copending applications Ser. Nos. 187,897 and 187,898, filed Oct. 8, 1971 now U.S. Pats. 3,755,411 and 3,752,843, respectively, the disclosures of which are hereby incorporated by reference.

The compounds of Formula A are useful for the control of insects. The utility of these compounds as insect control agents is believed to be attributable to their juvenile hormone activity. They are preferably applied to the immature insect, namely—during the embryo, larvae or pupae stage in view of their effect on metamorphosis and otherwise cause abnormal development leading to death or inability to reproduce. These compounds are effective control agents for Hemipteran, such as Lygaeidae, Miridae and Pyrrhocoridae; Lepidopteran, such as Pyralidae, Noctuidae and Gelechiidae; Coleopteran, such as Tenebrionidae, Crysomelidae and Dermestidae; Dipteran, such as mosquitos, flies; Homopteran, such as aphids and other insects. The compounds can be applied at low dosage levels of the order of 0.01 μg. to 25.0 μg. per insect. Suitable carrier substances include liquid or solid carriers, such as water, acetone, xylene, mineral or vegetable oils, talc, vermiculite, natural and synthetic resins and silica. Treatment of insects in accordance with the present invention is accomplished by spraying, dusting or exposing the insects to the vapor of the compounds of Formula A. Generally, a concentration of less than 25% of the active compound is employed. The formulations can include insect attractants, emulsifying agents or wetting agents to assist in the application and effectiveness of the active ingredient. In the application of the compounds, there is generally employed a mixture of the C-2,3 trans and cis isomers with trans isomerism at C-4,5 preferred.

The compounds of Formulas III, IV and V, in addition to their utility as valuable intermediates for the compounds of Formula A, are also useful agents for the control of insects. These compounds can be employed for the control of insects in the same way as the compounds of Formula A. The 4-oxo derivatives represented by Formula VI are useful agents for the control of insects. The novel 4-oxo compounds of Formula VI can be used for the control of insects in the same way as the compounds of Formula A.

The term "alkyl," as used herein, refers to a branched or straight chain saturated aliphatic hydrocarbon of one to twelve carbon atoms. The term "lower alkyl," as used herein, refers to an alkyl group having a chain length of one to six carbon atoms.

The term "carboxylic acyl," as used herein, refers to the acyl group of a carboxylic acid, anhydride or halide. The acyl group is determined by the particular carboxylic acid, halide or anhydride employed in the esterification. Although no upper limitation need be placed on the number of carbon atoms contained in the acyl group within the scope of the present invention, generally it contains up to eighteen carbon atoms. Typical carboxylic acyl groups include formyl, acetyl, propionyl, enanthoyl, benzoyl, trimethylacetyl, trichloroacetyl, trifluoroacetyl, t-butylacetyl, phenoxyacetyl, cyclopentylpropionyl, aminoacetyl, β-chloropropionyl, octadec-9-enoyl, dichloroacetyl, butyryl, pentanoyl, hexanoyl, phenylacetyl, p-methylbenzoyl, β-phenylpropionyl, 3,4-dimethylbenzoyl, p-isopropylbenzoyl, cyclohexylacetyl, stearoyl, methacryloyl, p-chloromethylbenzoyl, p-methoxybenzoyl and p-nitrobenzoyl.

The compounds of Formulas A, III, IV, V and VI have many other useful applications. These compounds are excellent lubricants for plastic and metal surfaces and as plasticizers aid in the processing and use of polymeric materials such as rubber, SBR, ABS, polypropylene and polyvinyl chloride.

The following examples are provided to illustrate the practice of the present invention. Temperature is given in degrees centigrade.

EXAMPLE 1

(A) Two g. of 3.7-dimethyloctanyl bromide is added to 2.5 g. of magnesium in 20 ml. of dry ether. A crystal of iodine may be added to initiate the reaction. After the initial reaction a solution of 20.1 g. of 3,7-dimethyloctanyl bromide and 40 ml. of dry ether is added slowly. After addition is complete, the mixture is refluxed to complete formation of the Grignard.

(B) To the Grignard solution of part (A), cooled to 0°, is added a solution of 14.2 g. of ethyl 3-formylcrotonate in dry ether, dropwise. After addition is complete, the mixture is stirred for about 2 hours at room temperature. Then sat. aqueous ammonium chloride is added dropwise with stirring until precipitate granulation. The mixture is filtered and the filtrate washed with brine, dried over magnesium sulfate and evaporated under reduced pressure to give ethyl 4-hydroxy-3,7,11-trimethyldodeca-2-enoate which can be purified by chromatography.

EXAMPLE 2

To a solution of 10 g. of ethyl 4-hydroxy-3,7,11-trimethyldodec-2-enoate and pyridine, at 0°, is added 1.2 molar equivalents of phosphorus oxychloride. The reaction mixture is left at 0° for 2 hours and then is warmed to 60° for one hour. After cooling, the mixture is diluted with water and then extracted with ether. The ethered phase is washed with dilute aqueous HCl and aqueous sodium bicarbonate, dried over calcium sulfate and evaporated under reduced pressure to yield ether 3,7,11-trimethyldodeca-2,4-dienoate which can be purified by distillation.

EXAMPLE 3

(A) To a solution of 5 g. of ethyl 4-hydroxy-3,7,11-trimethyldodec-2-enoate and pyridine, at 0°, is added 1.5 molar equivalents of acetic anhydride. The reaction mixture is allowed to stand overnight. Water is added dropwise to destroy excess anhydride and then the mixture is extracted with ether. The etheral phase is washed with dilute aqueous HCl and aqueous sodium bicarbonate, dried over calcium sulfate and evaporated to give ethyl 4-acetoxy-3,7,11-trimethyldodec-2-enoate.

(B) Using the procedure of Greewood, J. Org. Chem. 27, 2308 (July 1962), ethyl 4-acetoxy-3,7,11-trimethyldodec-2-enoate is pyrolized using a tube maintained at 400° and passage of the ester by oxygen-free nitrogen at a residence rate in the tube of 3.5 seconds. The pyrolysate is taken up in pentane, washed, and evaporated to give crude ethyl 3,7,11-trimethyldodeca-2,4-dienoate which is separated by fractional distillation.

EXAMPLE 4

A mixture of 3 g. of ethyl 4-hydroxy-3,7,11-trimethyldodeca-2-enoate, 1.5 molar equivalents of manganese dioxide and 50 ml. of hexane is prepared at 0°, under nitrogen, by slow addition of manganese dioxide. The reaction mixture is left for two hours and then filtered. The filter is washed with hexane and the combined washings and filtrate evaporated to give ethyl 4-oxo-3,7,11-trimethyldodec-2-enoated which is purified by chromatography.

EXAMPLE 5

To a solution of 5 g. of ethyl 4-hydroxy-3,7,11-trimethyldodec-2-enoate and one molar equivalent of tribuytlamine in dry ether, at 0°, is added one molar equivalent of thionyl chloride, dropwise. After addition is complete, the solution is stirred overnight at 0° then the mixture is washed with ice cold aqueous HCl, brine, cold aqueous sodium bicarbonate and brine, dried over calcium sulfate, and evaporated under reduced pressure to give ethyl 4-chloro - 3,7,11 - trimethyldodec - 2 - enoate which is purified by chromatography.

EXAMPLE 6

To a stirred mixture of 6.0 g. of ethyl 4-hydroxy-3,7,11-trimethyldodec-2-enoate and 1.1 molar equivalents of s-collidine, under nitrogen, is added one molar equivalent of lithium chloride dissolved in dry dimethylformamide. After cooling to 0°, 1.1 molar equivalents of methanesulfonyl chloride is added dropwise. After addition is complete, the mixture is stirred for about 24 hours at 0° and then poured into ice-water. The aqueous phase is extracted with ether/pentane and the combined extracts washed throughly with saturated copper nitrate solution to remove s-collidine. The extracts are dried over sodium sulfate and evaporated to give ethyl 4-chloro-3,7,11-trimethyldodec-2-enoate which is purified by chromatography.

EXAMPLE 7

A solution of 3.0 g. of ethyl 4-chloro-3,7,11-trimethyldodec-2-enoate and collidine is heated at about 150° for two hours. After cooling, the mixture is diluted with ether and washed with ice cold aqueous HCl, aqueous sodium bicarbonate and brine, dried over sodium sulfate and evaporated to give ethyl 3,7,11-trimethyldodec-2,4-dienoate which can be purified by distillation.

EXAMPLE 8

A solution of 3.0 g. of ethyl 4-hydroxy-3,7,11-trimethyldodec-2-enoate in pyridine is added to a solution of 1.2 molar equivalents of chromium trioxide/pyridine (2) complex in methylene dichloride, at 0°. After addition is complete, the mixture is left for one hour and then poured into sat. sodium bicarbonate and extracted with ether. The combined ether extracts are washed with water and brine, dried and evaporated to give ethyl 4-oxo-3,7,11-trimethyldodeca-2-enoate.

EXAMPLE 9

To 250 ml. of anhydrous pyridine, cooled to ice temperature, is added 35.2 g. of p-toluenesulfonyl chloride. When the sulfonyl chloride is dissolved, 25 g. of 7-methoxy-3,7-dimethyloctan-1-ol is added and washed in with 10 ml. of anhydrous pyridine. The reaction mixture is about 90% complete after five hours and then left overnight below room temperature. The 40 ml. of cold water is added and the mixture is extracted with pentane. The pentane extracts are combined, washed with dilute HCl, water and dried over potassium sulfate/potassium carbonate and evaporated to yield the tosylate.

To a solution of 36.4 g. of dry sodium iodide and 160 ml. of dry acetone is added 38.6 g. of the above tosylate in 40 ml. of dry acetone and the reaction mixture stirred 16 hours at room temperature. The mixture is filtered and the filtrate concentrated. The concentrate is taken up in pentane, washed with water, dried over sodium sulfate and evaporated to yield 7-methoxy-3,7-dimethyloctanyl iodide.

By using an equivalent amount of each of lithium bromide and lithium chloride in place of sodium iodide, there is prepared 7-methoxy-3,7-dimethyloctanyl bromide and 7-methoxy-3,7-dimethyl-octanyl chloride.

EXAMPLE 10

The procedure of Example 9 is used to prepare 3,6,7-trimethyloctanyl bromide, 7 - methoxy - 3,6,7-trimethyloctanyl bromide, 3,7 - dimethylnonanyl bromide, 6-methoxy - 3,6 - dimethylheptanyl bromide, 3,6-dimethylheptanyl bromide, and 6 - methoxy - 3,5,6 - trimethylheptanyl bromide from each of 3,6,7 - trimethyloctan - 1-ol, 7-methoxy - 3,6,7 - trimethyloctan - 1 - ol, 3,7 - dimethylnonan - 1 - ol, 6 - methoxy - 3,6-dimethylheptan-1-ol, 3,6-dimethylheptan-1-ol, and 6 - methoxy - 3,5,6-trimethylheptan-1-ol, respectively.

EXAMPLE 11

To a mixture of 2.8 g. of dihydrocitronellol and 25 ml. of benzene, at 0°, is added a solution of 5 ml. of phosphorus tribromide in 20 ml. of benzene slowly. The mixture is then allowed to rise to room temperature and stirred for 18 hours. The mixture is poured onto ice and then extracted with pentane. The organic phase is washed with aqueous sodium bicarbonate, water and brine, dried over magnesium sulfate and evaporated to yield 3,7-dimethyloctanyl bromide.

EXAMPLE 12

The synthesis of Example 1 is repeated using each of methyl 3-formylcrotonate and isopropyl 3-formylcrotonate in place of ethyl 3-formylcrotonate to give methyl 4-hydroxy-3,7,11-trimethyldodec-2-enoate and isopropyl 4-hydroxy-3,7,11-trimethyldodec-2-enoate, respectively.

EXAMPLE 13

The synthesis of Example 1 is repeated using 7-methoxy 3,7-dimethyloctanyl bromide and each of the bromides of Example 10 in place of 3,7-dimethyloctanyl bromide to prepare the respective esters, i.e.— ethyl 4-hydroxy-11-methoxy-3,7,11-trimethyldodec-2-enoate,
ethyl 4-hydroxy-3,7,10,11-tetramethyldodec-2-enoate,
ethyl 4-hydroxy-11-methoxy-3,7,10,11-tetramethyldodec-2-enoate,
ethyl 4-hydroxy-3,7,11-trimethyltridec-2-enoate,
ethyl 4-hydroxy-10-methoxy-3,7,10-trimethylundec-2-enoate,
ethyl 4-hydroxy-3,7,10-trimethylundec-2-enoate, and
ethyl 4-hydroxy-10-methoxy-3,7,9,10-tetramethylundec-2-enoate, respectively.

The thus-prepared 4-hydroxy compounds are esterified using acetic anhydride to prepare the corresponding 4-acetates.

EXAMPLE 14

Each of the 4-hydroxy compounds of Examples 12 and 13 is converted into the corresponding 4-chloro compound, i.e.— methyl 4-chloro-3,7,11-trimethyldodec-2-enoate,
isopropyl 4-chloro-3,7,11-trimethyldodec-2-enoate,
ethyl 4-chloro-11-methoxy-3,7,11-trimethyldodec-2-enoate,
ethyl 4-chloro-3,7,10,11-tetramethyldodec-2-enoate,
ethyl 4-chloro-11-methoxy-3,7,10,11-tetramethyldodec-2-enoate, ethyl 4-chloro-3,7,11-trimethyltridec-2-enoate,
ethyl 4-chloro-10-methoxy-3,7,10-trimethylundec-2-enoate,
ethyl 4-chloro-3,7,10-trimethylundec-2-enoate, and
ethyl 4-chloro-10-methoxy-3,7,9,10-tetramethylundec-2-enoate.

EXAMPLE 15

Each of the 4-hydroxy compounds of Examples 12 and 13 is oxidized to prepare the corresponding 4-oxo-compound, i.e.— methyl 4-oxo-3,7,11-trimethyldodec-2-enoate,
isopropyl 4-oxo-3,7,11-trimethyldodec-2-enoate,
ethyl 4-oxo-11-methoxy-3,7,11-trimethyldodec-2-enoate,
ethyl 4-oxo-3,7,10,11-tetramethyldodec-2-enoate,
ethyl 4-oxo-11-methoxy-3,7,10,11-tetramethyldodec-2-enoate,
ethyl 4-oxo-3,7,11-trimethyltridec-2-enoate,
ethyl 4-oxo-10-methoxy-3,7,10-trimethylundec-2-enoate,
ethyl 4-oxo-3,7,10-trimethylundec-2-enoate, and
ethyl 4-oxo-methoxy-3,7,9,10-tetramethylundec-2-enoate.

EXAMPLE 16

The compounds of Examples 13 and 14 are dehydrated using the synthesis described herein to prepare the corresponding 2,4-di-unsaturated esters of Formula A.

EXAMPLE 17

To an ice-cooled solution of 1.0 g. of 7-methoxy-3,7-dimethyloctan-1-al in 50 ml. of methanol and 3 ml. of water is added 1.0 g. of sodium borohydride. The reaction is stirred and allowed to stand 2 hours at room temperature. Acetic acid (2 ml.) is added and the mixture concentrated under reduced pressure followed by dilution with water. The diluted concentrate is extracted with ethyl acetate and the extracts combined, washed with water, dried and evaporated to give 7-methoxy-3,7-dimethyloctan-1-ol.

By use of the foregoing procedure, other carbonyls of Formula VII can be reduced to the alcohol of Formula VIII.

EXAMPLE 18

To a mixture of 0.19 g. of magnesium turning and 10 ml. of dry tetrahydrofuran is added 0.15 g. of dry ethylenedibromide. The mixture is boiled 0.5 hour, and then 1.91 g. of 3,7-dimethyloctanyl bromide is added. Boiling is continued 1.5 hours. The thus prepared Grignard reagent is slowly added to a mixture of 6 ml. of tetrahydrofuran and ethyl 3-formylcrotonate, under nitrogen, at 0° to —10°. After addition is complete, the mixture is allowed to warm to room temperature and stand overnight. Saturated aqueous ammonium chloride (1.4 ml.) is added and the mixture stirred. Ether (100 ml.) is added and the mixture filtered. The solids are washed with ether and the combined washings and filtrate are washed with 25 ml. of water (2×) and once with saturated aqueous sodium chloride and then dried (CaSO$_4$). Solvent is removed by rotary evaporation to yield ethyl 4-hydroxy-3,7,11-trimethyldodec-2-enoate (mostly trans) which can be purified by preparative thin layer chromatography eluting ether/hexane (1/10) and distillation.

Three groups of 30 each of *Aedes aegypti*, fourth instar larvae, in 50 ml. of tap water containing a few drops of liver powder suspension, room temperature of 28° and photoperiod of 18 hours, are treated with ethyl 4-hydroxy-3,7,11-trimethyldodeca-2-enoate (mostly trans) using 50 microliters of acetone as the carrier at three different dosage levels. A fourth group is maintained under identical conditions. Each group is scored after seven days by the following system:

0=normal adult, completely emerged (free or floating); 1=abnormal adult, non-viable; 2=incompletely emerged adult; 3=dead pupa; and 4=dead larvae. For each group the total number of animals in classes 1–4 is divided by 30 to determine the percentage results. The IC$_{50}$ is computed by plotting on semi-logarithmic paper, the dose on the horizontal axis and the percentage response on the vertical axis. The IC$_{50}$ was determined to be less than 1.0 p.p.m. Each of the larvae of the control group developed into normal adults.

What is claimed is:

1. A compound of the formula:

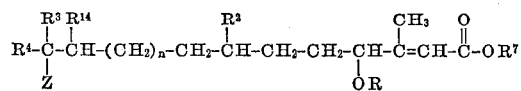

wherein, each of R$^2$, R$^3$ and R$^4$ is methyl or ethyl;
R$^{14}$ is hydrogen or methyl;
R$^7$ is lower alkyl;
R is hydrogen or carboxylic acyl of one to eighteen carbon atoms;
n is zero or the positive integer one; and
Z is hydrogen or lower alkoxy.

2. A compound of claim 1 wherein R$^{14}$ is hydrogen and Z is hydrogen, methoxy or ethoxy.

3. A compound of claim 2 wherein R$^7$ is methyl or ethyl and R is lower saturated aliphatic hydrocarbon carboxylic acyl group of up to six carbon atoms.

4. A compound of claim 3 wherein R is acetyl.

5. A compound of claim 2 wherein each of R$^2$, R$^3$ and R$^4$ is methyl; n is one; and Z is hydrogen or methoxy.

6. A compound of claim 5 wherein R$^7$ is methyl or ethyl.

7. A compound of claim 6 wherein R is hydrogen or acetyl.

8. A compound of claim 7 wherein Z is methoxy.

9. A compound of the formula:

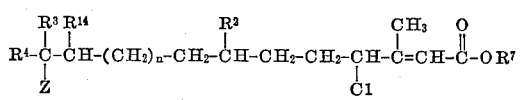

wherein,
each of R$^2$, R$^3$ and R$^4$ is methyl or ethyl;
R$^{14}$ is hydrogen or methyl;
R$^7$ is lower alkyl;
n is zero or the positive integer one; and
Z is hydrogen or lower alkoxy.

10. A compound of claim 9 wherein R$^{14}$ is hydrogen and Z is hydrogen, methoxy or ethoxy.

11. A compound of claim 10 wherein R$^7$ is methyl or ethyl.

12. A compound of claim 10 wherein each of R$^2$, R$^3$ and R$^4$ is methyl; n is one; and Z is hydrogen or methoxy.

13. A compound of claim 12 wherein R$^7$ is methyl or ethyl.

14. A compound of claim 13 wherein Z is methoxy.

15. A compound of the formula:

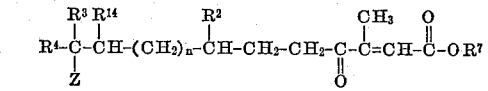

wherein,
each of R$^2$, R$^3$ and R$^4$ is methyl or ethyl;
R$^{14}$ is hydrogen or methyl;
R$^7$ is lower alkyl;
n is zero or the positive integer one; and
Z is hydrogen or lower alkoxy.

16. A compound of claim 15 wherein R$^{14}$ is hydrogen and Z is hydrogen, methoxy or ethoxy.

17. A compound of claim 16 wherein R$^7$ is methyl or ethyl.

18. A compound of claim 15 wherein each of R$^2$, R$^3$ and R$^4$ is methyl; n is one; and Z is hydrogen or methoxy.

19. A compound of claim 18 wherein R⁷ is methyl or ethyl.

20. A compound of claim 19 wherein Z is methoxy.

References Cited

UNITED STATES PATENTS

| | | | |
|---|---|---|---|
| 3,304,333 | 2/1967 | Truscheit et al. | 260—617 |
| 2,928,854 | 3/1960 | Bolhofer | 260—413 |
| 3,657,291 | 4/1972 | Jarolim et al. | 260—408 |
| 3,637,674 | 1/1972 | Jarolim et al. | 260—240 R |
| 3,692,851 | 9/1972 | Henrick et al. | 260—654 R |
| 3,671,558 | 6/1972 | Siddall et al. | 260—410.9 R |
| 3,193,565 | 7/1965 | Tschesche et al. | 260—408 |
| 3,541,154 | 11/1970 | Schmialek et al. | 260—583 |
| 3,666,780 | 5/1972 | Calame et al. | 260—405 |
| 3,669,997 | 6/1972 | Calame et al. | 260—410.9 R |

FOREIGN PATENTS 129,370   9/1950   Sweden.

OTHER REFERENCES

Chemical Abstracts, vol. 50, 8444i (1956).

Manufacturing Chemist and Aerosol News, vol. 36, No. 11, pp. 79–80 (1965).

LEWIS GOTTS, Primary Examiner

D. G. RIVERS, Assistant Examiner

U.S. Cl. X.R.

252—565; 260—31.2 R, 32.2, 404, 408, 410.9 R, 410.9 N, 593 R, 594, 633, 632 R, 635 R, 638 B, 654, 665 G; 425—312, Dig. 12

UNITED STATES PATENT OFFICE
CERTIFICATE OF CORRECTION

Patent No. 3,793,353              Dated March 1, 1974

Inventor(s) Clive A. Henrick

It is certified that error appears in the above-identified patent and that said Letters Patent are hereby corrected as shown below:

Column 5, line 8, "dodeca-2-enoate" should read --dodec-2-enoate--; and
line 14, "dodec-2-enoated" should read --dodec-2-enoate--.

Claim 15, that portion of the formula reading

" $(CH_2)_n\!\!-\!\!\overset{\overset{\displaystyle R^2}{|}}{CH}$ " should read -- $(CH_2)_n\!\!-\!\!CH_2\!\!-\!\!\overset{\overset{\displaystyle R^2}{|}}{CH}$ --.

Signed and sealed this 18th day of June 1974.

(SEAL)
Attest:

EDWARD M. FLETCHER, JR.          C. MARSHALL DANN
Attesting Officer                Commissioner of Patents